(12) United States Patent
Madejski et al.

(10) Patent No.: US 7,843,874 B2
(45) Date of Patent: Nov. 30, 2010

(54) CONFIGURABLE AND FLEXIBLE WIRELESS LINK ADAPTATION METHOD AND DEVICE

(75) Inventors: Tomasz Madejski, Gdansk (PL); Krzysztof Perycz, Chmielno (PL)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 11/862,388

(22) Filed: Sep. 27, 2007

(65) Prior Publication Data

US 2009/0086687 A1    Apr. 2, 2009

(51) Int. Cl.
*H04W 4/00* (2009.01)
(52) U.S. Cl. .................. 370/329; 370/338; 370/341
(58) Field of Classification Search .......... None
See application file for complete search history.

(56) References Cited

U.S. PATENT DOCUMENTS

| | | | |
|---|---|---|---|
| 7,050,480 B2 * | 5/2006 | Ertel et al. ............. | 375/141 |
| 7,616,610 B2 * | 11/2009 | Kuchibhotla et al. ....... | 370/335 |
| 7,680,457 B2 * | 3/2010 | Jin et al. ................ | 455/63.1 |
| 2007/0183380 A1 * | 8/2007 | Rensburg et al. ......... | 370/338 |
| 2007/0280175 A1 * | 12/2007 | Cheng et al. ............ | 370/338 |
| 2008/0159203 A1 * | 7/2008 | Choi et al. .............. | 370/328 |
| 2008/0205358 A1 * | 8/2008 | Jokela .................. | 370/338 |
| 2009/0040970 A1 * | 2/2009 | Ahmadi et al. .......... | 370/329 |

* cited by examiner

*Primary Examiner*—Chi H Pham
*Assistant Examiner*—Soon-Dong D Hyun
(74) *Attorney, Agent, or Firm*—Cool Patent, P.C.; Joseph P. Curtin

(57) ABSTRACT

A method and apparatus for implementing user defined Link Adaptation solutions in a wireless system.

14 Claims, 5 Drawing Sheets

CONFIGURABLE AND FLEXIBLE WIRELESS LINK ADAPTATION METHOD AND DEVICE

BACKGROUND

Link adaptation in a wireless system is part of radio resource management and may comprise a set of algorithms and parameters to optimize the utilization of an air interface and hardware and assure adequate radio link quality (error bit rate). In the case of radio communication systems based on the Institute of Electrical and Electronics Engineers 802.16 (IEEE 802.16) standard, it may be the primary responsibility of a base station controller (BS) to dynamically manage: channel allocation, subscriber (SS) transmission parameters (such as, transmit power, modulation scheme and/or error correction scheme) and/or subscriber handover. Such dynamic management by a BS may be based on measured link quality indicators. In this way, radio resources may be efficiently allocated according to various radio conditions. In order to allocate available radio resources efficiently, a BS may select transmission parameters from a variety of available modulation schemes, subscriber transmission powers and error correction schemes, such as, forward error correction coding and repetition coding. At times it may be enough to adjust subscriber transmission power only. At other times, modulation and coding may be adjusted as well. Standards, such as IEEE 802.16, may define generic rules or procedures for radio bandwidth allocation and protocols for delivering information to participants. However, standards do not define exactly how the radio resources should be allocated and how the transmission parameters should be set. Hardware and/or software vendors may provide link adaptation methods enabling a BS to handle changes in radio conditions.

DETAILED DESCRIPTION

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail so as not to obscure claimed subject matter.

In the following description, the phrase 'Link Adaptation' is used throughout the text and is intended to refer to correction and/or action taken in a wireless system to handle changes in radio conditions for uplink and downlink communications. The phrase 'Link Adaptation solution' is used throughout the text and intended to refer to selection of one or more Link Adaptation corrections and/or actions. The phrase 'Link Adaptation solution parameter(s)' is used throughout the text and intended to refer to parameters related to Link Adaptation solutions. The terms "hard-code" and "source code" are used interchangeably. The terms "hard-coding" and "hard-coded" are used to mean embedding or embedded data in the source code of a computer program. Additionally, the term "run-time" herein refers to a period of time when a computer program is in operation and program commands may be obeyed. The term "compile time" herein refers to a period of time when source code for a computer program is being compiled (as in, read-in, analyzed, and translated) to create an executable computer program. The terms "layer up" and/or "layer down" herein refer to changing parameter sets used by a Correction and Action Policy (CAP) module, when switching from one specific modulation and/or coding scheme to another. The "up" direction denotes moving toward more efficient (but less robust) modulation and/or coding, while "down" denotes changing to less efficient (but more robust) modulation and coding scheme. The term "scanning" herein refers to listening to and/or measuring the signal activity of one or more BS's to determine which BS the SS is receiving with the best quality. Scanning information may be used during a hand-over procedure, when the current BS is handing over the SS to the BS selected by the SS during the scanning.

Figure 1:
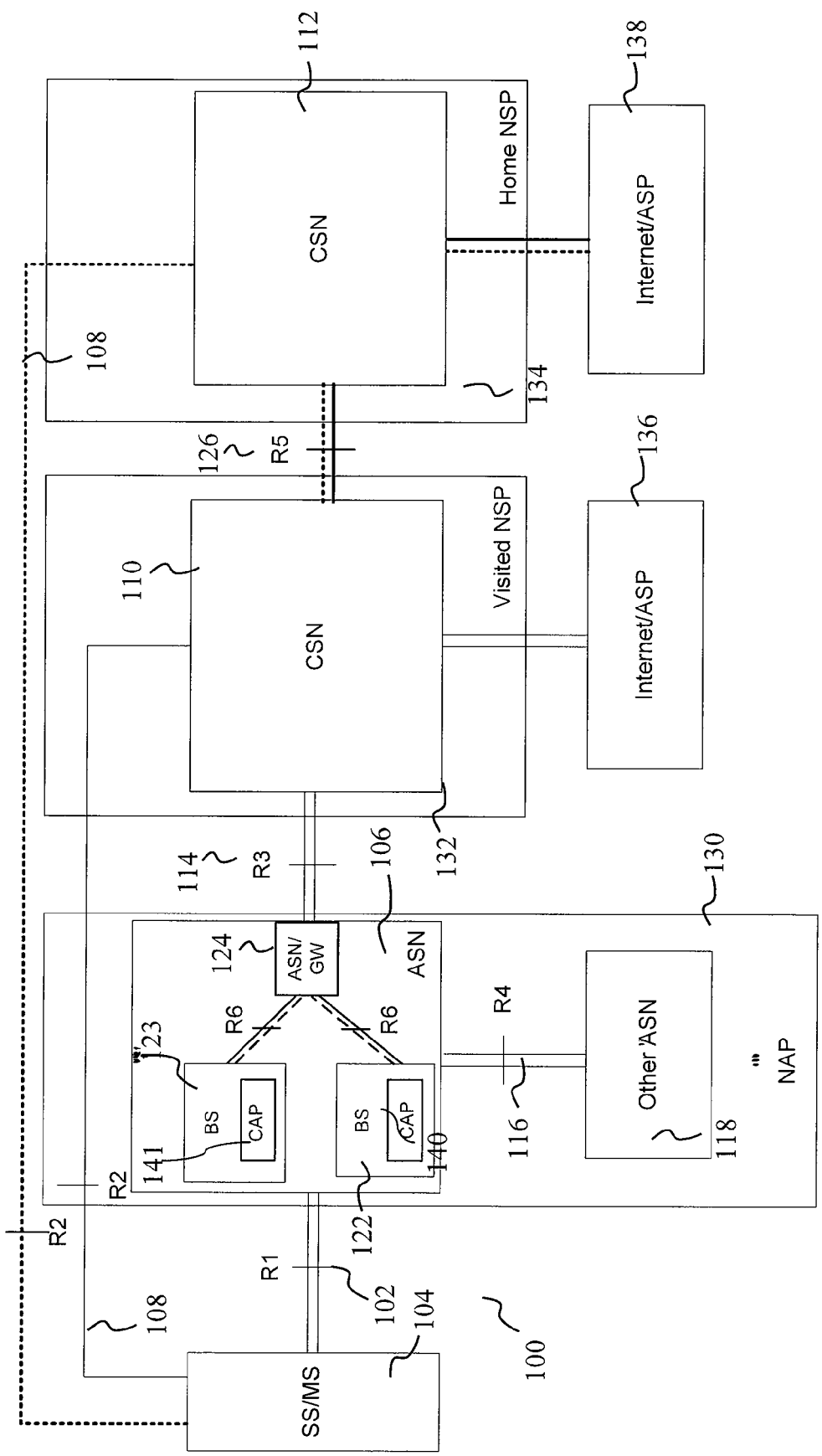
FIG. 1 is a block diagram of a particular embodiment of a Worldwide Interoperability for Microwave Access (WiMAX) network.

FIG. 1 is a block diagram of a particular embodiment of a Worldwide Interoperability for Microwave Access (WiMAX) network 100. According to a particular embodiment, WiMAX network 100 may be based on the IEEE 802.16 standard.

WiMAX network 100 may comprise a Network Access Provider (NAP) 130, a visited Network Service Provider (vNSP) 132, a home Network Service Provider (hNSP) 134 and a subscriber station or mobile station (SS) 104. In a particular embodiment, SS 104 may be coupled to NAP 130. NAP 130 may comprise Access Service Networks (ASN) 106 and 118. Although ASN 106 and 118 may comprise the same or similar components, further description of a particular embodiment of an ASN will refer only to ASN 106 for clarity. However, ASN 118 may also comprise the same or similar components and capabilities disclosed herein with respect to ASN 106. In a particular embodiment, ASN network 106 may further comprise BS 122 and 123 coupled to Access Service Network Gateway (ASN/GW) 126. ASN 106 may be further connected to vNSP 132 via Connectivity Service Network (CSN) 110. CSN 110 may connect directly to the Internet or an Application Service Provider (ASP) allowing SS 104 to access various services such as data, voice and video. Additionally, CSN 110 may be connected to CSN 112 in HNSP 134 which may also be connected to the Internet or an ASP.

In a particular embodiment, in WiMAX network 100 a variety of interfaces may couple various network devices. For instance, R1 interface 102 may couple SS 104 and ASN 106, R2 interface 108 may couple SS 104 and CSN 110 and/or CSN 112, R3 interface 114 may couple ASN 106 and CSN 110, R4 interface 116 may couple ASN 106 and ASN 118, R5 interface 126 may couple vNSP 132 and hNSP 134 and R6 interface 120 may couple base stations 122 and 123 to ASN/GW 126. According to a particular embodiment, the aforementioned interfaces may support various interconnect protocols. Such protocols may relate to the various network devices interconnected or to the particular plane in which the interface is operating. Further explanation of such network interfaces is beyond the scope of this disclosure and details have been omitted for clarity.

Referring still to FIG. 1, in a particular embodiment, BS 122 and/or BS 123 may comprise Correction Action Policy (CAP) modules 140 and/or 141, respectively. Such CAP modules 140 and 141 may be capable of Link Adaptation as discussed in detail with respect to FIGS. 2-5. For the sake of clarity, only BS 122 and CAP module 140 will be discussed in detail. However, BS 123 and CAP module 141 may also comprise the same or similar components and capabilities disclosed with respect to BS 122 and CAP module 140 and claimed subject matter is not so limited.

Continuing with FIG. 1, in a particular embodiment, at run-time, CAP module 140 may be capable of processing input values received from various components of WiMAX network 100. In a particular embodiment, CAP Module 140 may enable a user to input configuration data defining Link Adaptation (LA) parameters, referred to as CAP Layers (not shown), CAP Areas (not shown) and CAP Action Sets (not shown). In so doing, a user may specify a number of customized correction and/or action policies describing how to handle changes in radio conditions for uplink and downlink communications between SS 104 and BS 122. For instance, a user may define LA solution parameters, such as, input value thresholds and/or ranges, modulation and coding parameters, handover triggers and procedures, transmission power level settings and/or event parameters. In a particular embodiment, because a user may define LA solution parameters at runtime, this may reduce the need for hardware and/or software vendors to provide customized LA solutions at compile time. According to a particular embodiment, users may adapt CAP Module 140 LA solution parameters to their needs by configuring it using their own configuration data. In a particular embodiment, CAP Module 140 may provide LA solutions that are highly configurable at runtime instead of a process fixed during compile time.

According to a particular embodiment, CAP module 140 may enable flexible and configurable LA in WiMAX network 100. CAP module 140 may comprise a correction and/or action policy process hard-coded into BS 122 software source code one or more CAP Layers (run-time parameter sets) corresponding to particular modulation and/or coding schemes. In a particular embodiment, there may be separate CAP layers for uplink and downlink communications. In a particular embodiment, a CAP Layer may further comprise one or more CAP Areas (not shown) comprising one or more CAP Action Sets. Such CAP Action Sets may comprise instructions for a particular correction and/or action to be triggered or executed by CAP Module 140. According to a particular embodiment, CAP Module 140 may determine a correction and/or action to be implemented by determining a subsequent CAP Layer, determining a CAP Area within the determined CAP Layer and finally determining a CAP Action within the selected CAP Area. CAP Layers, CAP Areas and CAP Actions may be determined based on input values. Determination of CAP Layers, CAP Areas and CAP Actions is discussed in more detail with reference to FIG. 2 for uplink communication and in FIG. 3 for downlink communication.

Figure 2:
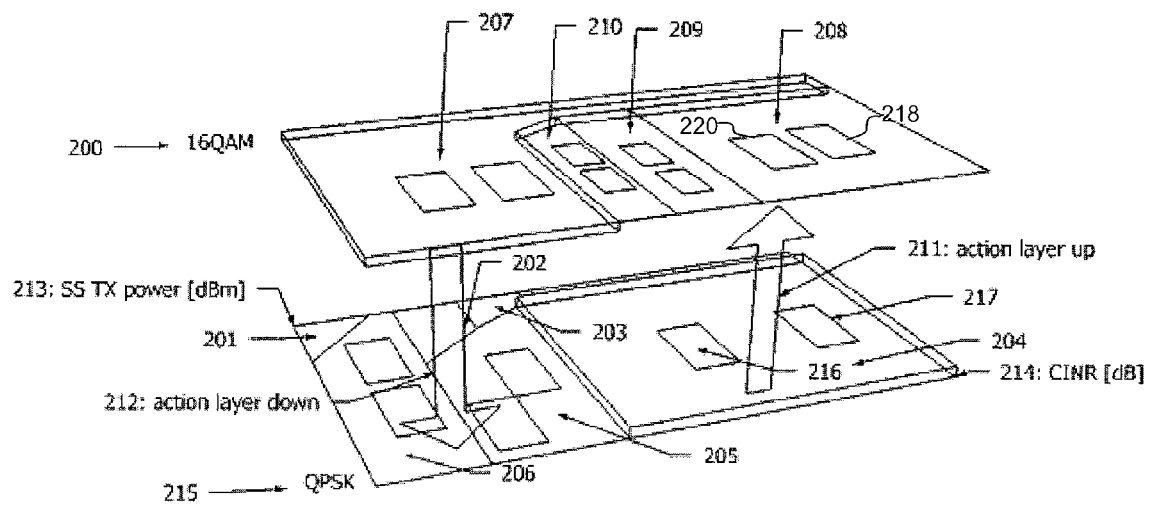
FIG. 2 is graphical representation of a particular embodiment of two uplink CAP Layers.

FIG. 2 is graphical representation of CAP Layer 200 and CAP layer 215 for uplink communication. CAP layers 200 and 215 may correspond to different modulation schemes. For instance, in a particular embodiment, CAP layer 200 may correspond to 16 Quadrature Amplitude Modulation (16QAM) and CAP layer 215 may correspond to Quadrature Phase Shift Keying (QPSK). In a particular embodiment, CAP Layer 200 and CAP layer 215 may be defined by a range of input values, for instance, Carrier to Interference-and-Noise Ratio (CINR) values 214 and SS TX power values 213. In a particular embodiment, CAP Layer 200 and CAP layer 215 may comprise a variety of uplink CAP Areas. Each CAP Area 201, 202, 203, 204, 205, 206, 207, 208, 209 and 210 may comprise one or more CAP Action Sets. In a particular embodiment, CAP Action Sets 216, 217, 218 and 220 may comprise instructions for one or more corrections and/or actions that may be executed and/or triggered by CAP Module 140. Such instructions may comprise, for instance, changing CAP Layer (thus changing modulation or coding scheme), changing SS transmission power, and/or starting handover procedure.

In a particular embodiment, a combination of CINR values 214 and SS TX power values 213 may point to a particular CAP Area within a CAP layer. Processing of a Received Signal Strength Indication (RSSI) input value by CAP Module 140 may point to a particular CAP Action Set within the selected CAP Area. However, these are merely examples of input values that may be used to select CAP layers, CAP Areas and CAP Action Sets and claimed subject matter is not so limited.

Selection of a particular CAP Action Set within a CAP Area may be based on comparison of an RSSI value to a pre-set threshold RSSI value and/or a pre-set range of RSSI values. For instance, in a particular embodiment, CAP Area 204 may be selected based, at least in part, on CINR 214 and SS TX power 213 input values. CAP Area 204 may comprise various CAP Action Sets, such as, CAP Action Set 216 and CAP Action Set 217. CAP Action Sets 216 and 217 may comprise instructions for various LA corrections and/or actions to be triggered or executed by CAP module 140. CAP module 140 may process an RSSI input value and may select CAP Action Set 216 based at least in part of comparison of RSSI input value to a pre-set threshold RSSI value. However, this is merely an example of CAP Areas and CAP Action Sets and input values that may be used for selection of CAP Areas and CAP Action Sets and claimed subject matter is not so limited.

In a particular embodiment, CAP Action Set 216 may comprise LA solution instructions for performing at least one of the following actions: do nothing, increase SS TX power (for uplink communication), decrease SS TX power (for uplink communication), increase boosting power (for downlink communication), decrease boosting power (for downlink communication), request starting of a hand-over procedure, request starting of a scanning action, and/or request a CAP layer change. In a particular embodiment, current settings and state of wireless system 100 may provide the most appropriate or efficient use of radio resources; therefore, doing nothing may be an appropriate LA solution. In a particular embodiment, with respect to SS TX and/or boosting power a user may configure the action to decide how much the power should be increased or decreased. In a particular embodiment, a user may provide configuration data via a user interface application and may provide LA solution parameters to control a variety of settings, such as, events, input value thresholds and ranges, modulation and coding requirements, handover requests and/or SS transmission power or boosting power level settings. However, these are merely examples of instructions for actions that a CAP Action Set may comprise and claimed subject matter is not so limited.

CAP Action Set 216 may comprise instructions for a CAP layer change solution 211. In a particular embodiment, moving from CAP Layer 215 to CAP Layer 200 may comprise a 'layer up' action and may change the current modulation, QPSK, to a less robust modulation scheme, 16QAM. Accordingly, changing the modulation scheme may involve selection of another CAP Layer. A new CAP layer may comprise a different CAP Area layout with a different range CINR values 214 and SS TX power values 213 than the original CAP layer. CAP Action Sets may also vary between CAP layers because the new modulation scheme may require some other correction and/or action as the result of the same input values. However, this is merely an example of a CAP layer change and claimed subject matter is not so limited.

Figure 3:
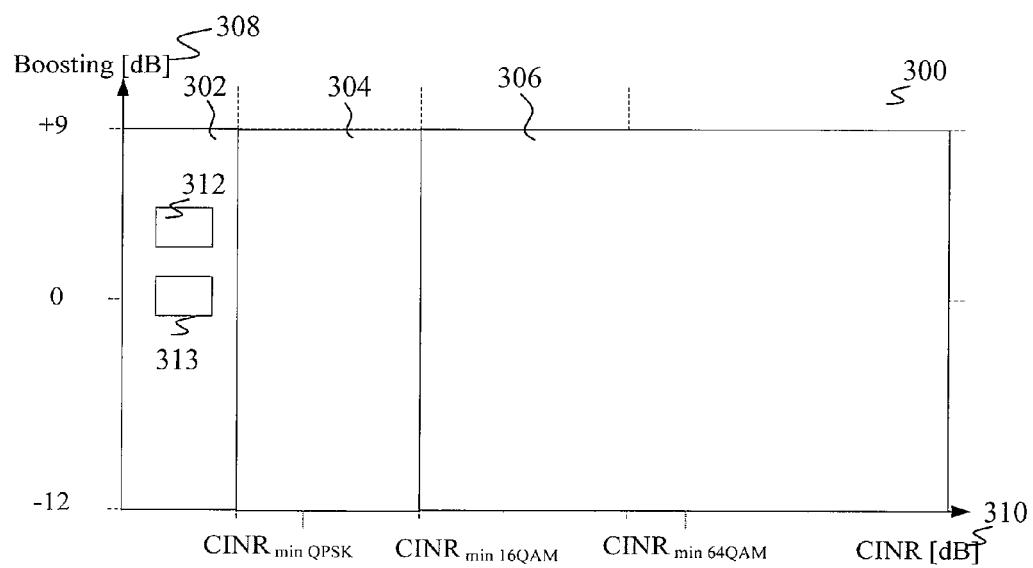
FIG. 3 is graphical representation of a particular embodiment of a single downlink CAP Layer.

FIG. 3 is graphical representation of a single downlink CAP Layer 300 comprising a variety of downlink CAP Areas 302, 304 and 306. In a particular embodiment, there may be one or more downlink CAP layers, as illustrated for the uplink case shown in FIG. 2 and switching between CAP layers in a downlink communication situation is analogous to the layer change illustrated in FIG. 2. FIG. 3 depicts a single CAP Layer for simplicity. In a particular embodiment, CAP Layer 300 is similar to CAP Layers 200 and 215 described above with reference to FIG. 2. However, in a particular embodiment, input value 308 on the y-axis may be "boosting power." Boosting power may be a deviation expressed in dB from the nominal BS transmission (TX) power. According to a particular embodiment, CAP Areas 302, 304 and 306 may comprise one or more CAP Action Sets 313 and 314. Input values, such as boosting power 308 and measured CINR value 310 may point to CAP Area 302. Measurement of RSSI input value may point to CAP Action Set 313. In a particular embodiment, CAP Action Set 13 may comprise instructions for handover to be carried out by CAP Module 140 (referring to FIG. 1). However, this is merely an example of input values and configuration of a CAP Area and CAP Action Set for a downlink communication and claimed subject matter is not so limited.

Figure 4:
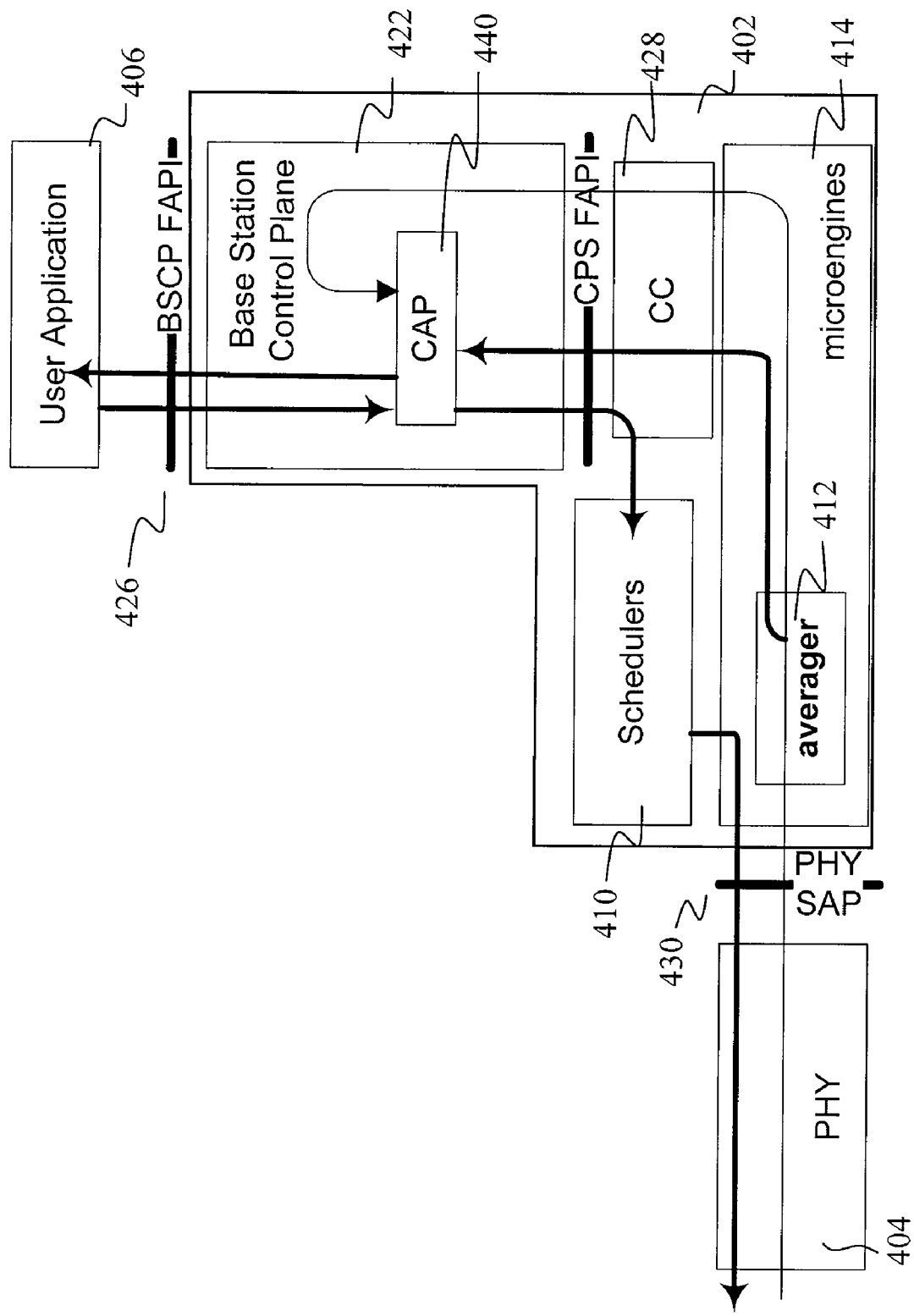
FIG. 4 is a block diagram of a particular embodiment of a wireless system.

FIG. 4 is a block diagram of a particular embodiment of a wireless system 400 illustrating interaction of Media Access Layer (MAC) 402, Physical Layer (PHY) 404 and User Application (UA) 406. In a particular embodiment, MAC 402 may comprise, base station control plane (BSCP) 422, call complement interface (CC 428), schedulers 410, micro-engines 414 and averager 412. In a particular embodiment, BSCP 422 may further comprise CAP Module 440. CAP Module 440 may receive input values from a variety of components. For instance, CAP 440 may receive; user defined configuration data providing LA solution parameters via UA 406, R6 LA control messages (as defined in the WiMAX architecture specification 802.16) from ASN/GW 124 (with reference to FIG. 1), custom CAP layer definitions from UA 406, uplink RSSI and/or CINR values from local PHY 404 (via Averager 412), and/or downlink RSSI and CINR values and uplink SS TX power from SS 104 (with reference to FIG. 1) via microengines 414 and BSCP 422.

In a particular embodiment, a user may define CAP Module 440 LA solutions reducing the need for hardware and/or software vendors to provide customized LA solutions at compile time. According to a particular embodiment, a user may customize CAP Layers, CAP Areas and CAP Action Sets by interfacing with UA 406 through any of a variety of graphical user interface (GUI) set-ups. For instance, in a particular embodiment, there may be a tool capable of converting user-created drawings such as FIG. 2 or 3 to numerical values sets defining CAP Layers, CAP Areas and CAP Action Sets. However, this is merely an example of a GUI for a UA 406 and claimed subject matter is not so limited.

In a particular embodiment, CAP Module 440 may process input values. Based, at least in part, on the received input data, CAP Module 440 may determine a correction and/or action to be implemented by MAC 402. In a particular embodiment, determining a correction and/or action to be implemented may comprise determining a CAP Layer, determining a CAP Area within the selected CAP Layer and determining a CAP Action within the selected CAP Area.

In a particular embodiment, CAP 440 may prepare correction and/or action policy change requests for scheduler 416. Scheduler 416 may notify UA 406 of a CAP Module 440 correction and/or action policy decision. As discussed above, such a correction and/or action policy decision may be, for instance, that a condition has been met which requires starting of a hand-over action, that a condition has been met that requires starting of the scanning action and/or that current CAP layer has or should be changed.

In a particular embodiment, BSCP Functional Application Programming Interface (BSCP FAPI) 426 may be an asynchronous interface. In a particular embodiment, UA 406 may comprise user-written software implementing configuration and management functionality. UA 406 may communicate with MAC 402 via BSCP FAPI 426. In a particular embodiment, in accordance with BSCP FAPI 426 calls, UA 406 may initiate an action (a 'request' call). When the action is complete, UA 406 may receive a call-back from Base Station Control plane 422 comprising the result of the action. In a particular embodiment, UA 406 may receive an unsolicited call-back (an 'event'). An event may be triggered by a user defined incident, such as a change in the quality of the uplink signal. In a particular embodiment, an event may be generated by micro-engine 414 and may send input data such as CINR and RSSI values to CAP Module 440. According to a particular embodiment, when the computer system is booting, UA 406 may enforce proper configuration of underlying software. Such enforcing may include setting WiMAX parameters at like frame size, setting the size of downlink and uplink portions of a frame, setting the supported WiMAX options, setting the statistics reporting options, setting CAP Layer parameters and so on. In this way UA 406 may set LA solution parameters and set initial conditions for CAP Module 440. However, this is merely an example of a method of implementing configuration and management functionality in a wireless system and claimed subject matter is not so limited.

Figure 5:
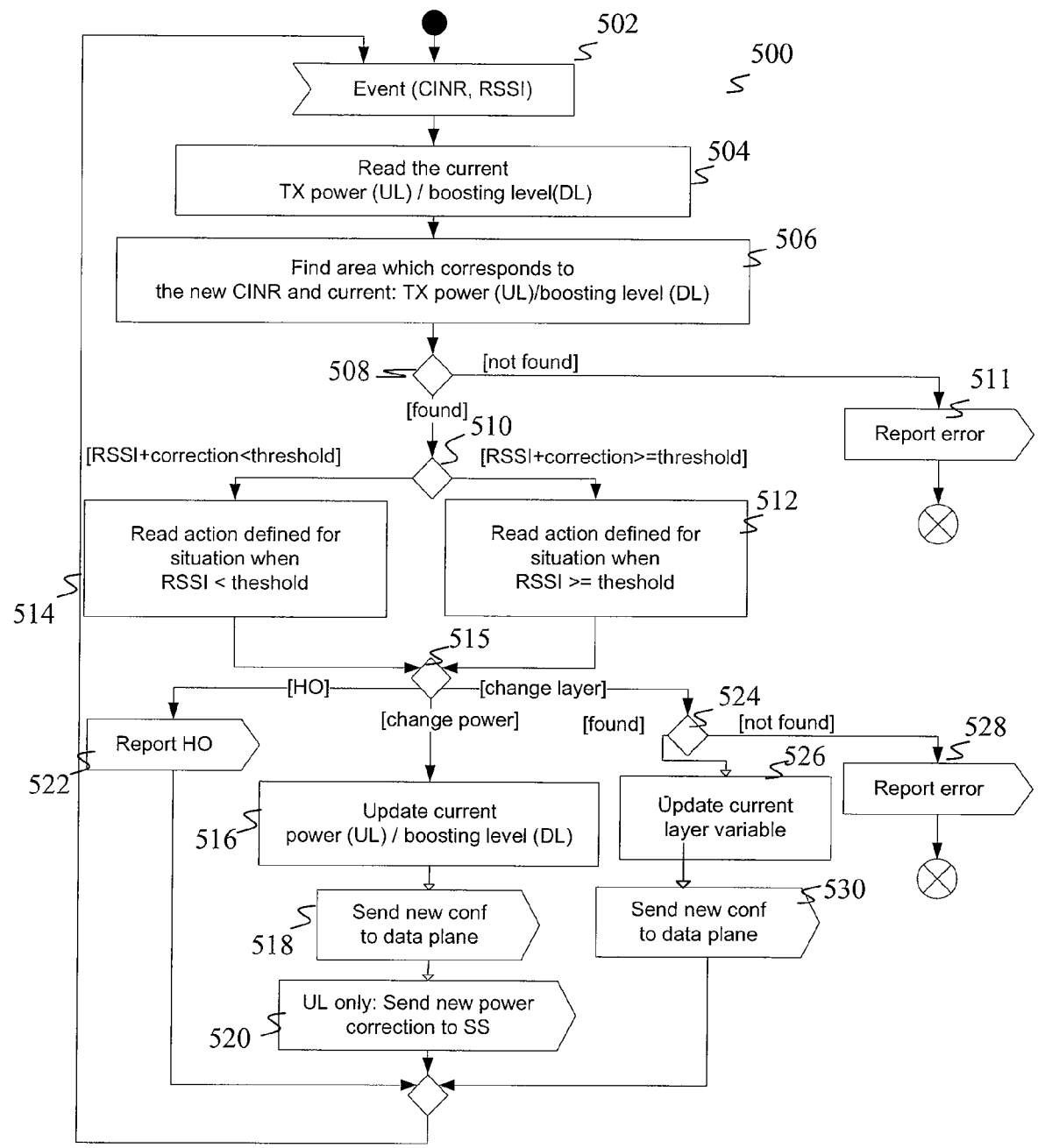
FIG. 5 is a flowchart illustrating a particular embodiment of a CAP process for both uplink and downlink directions.

In FIG. 5, a flowchart illustrates a particular embodiment of CAP process 500 that may run in CAP module 140 in BS 122 (shown in FIG. 1), with two variants for uplink and downlink processing shown. In a particular embodiment, CAP process 500 begins within a particular CAP layer, such as CAP layer 315 as described above. In a particular embodiment, an initial CAP Layer may comprise an initial modulation scheme, such as, a QPSK modulation scheme. An initial modulation scheme may be determined by a variety of methods. However, this is merely an example of an initial state for a CAP process 500 and claimed subject matter is not so limited.

According to a particular embodiment, CAP process 500 may determine an appropriate correction and/or action to take by determining which CAP Area within the current CAP Layer to query for an applicable CAP Action Set. Such determining may be based at least in part on input values, such as, for instance, CINR, SS TX power or boosting level, and RSSI values.

In processing block 502, a predefined event sends CINR and RSSI values to CAP Module 140. Such an event may comprise a variety of parameters and may be related to a change of the quality of an uplink or downlink signal. In a particular embodiment, a user may define event parameters when setting configuration data defining LA solution parameters. According to a particular embodiment, CINR and RSSI values may be sent from a variety of devices, such as, microengines 414 and/or an averager 412, for instance to CAP module 440. In a particular embodiment, an event triggering change in the link quality may be measured by a variety of standards. Such as, for instance, a change in link quality may be measured over time or may be an instantaneous measure of link quality. Such standards may be user defined. However, these are merely examples of CAP process input values and events and claimed subject matter is not so limited.

In processing block 504, CAP Module 440 may read CINR value and current SS TX power value and/or a current boosting level depending on whether operation is taking place in an uplink or downlink case. In processing block 506, CAP Module 140 may correlate CINR value and current SS TX power value and/or a current boosting level to a CAP Area. At decision block 508, CAP Module 440 may determine whether a CAP Area can be found. If CAP Area is not found, CAP process 500 flows to block 511 and an error is reported to UA 406. If a CAP Area is identified then CAP process 500 flows to decision block 510 where RSSI input value may be compared to a pre-set threshold value, T, to determine a CAP Action Set. In a particular embodiment, a CAP Action Set may comprise instructions, such as, change SS TX power or boosting power by X dB, request starting of hand-over procedure, request starting of a scanning action, request a CAP layer change which may change the modulation scheme. According to a particular embodiment, a user may define LA solution parameters and correction and/or actions instructions associated with CAP Action Sets. In a particular embodiment, if RSSI value is greater than or equal to T, CAP process 500 may flow to processing block 512 where CAP Module 440 may read CAP Action Set instruction defined for RSSI value being greater than or equal to T. If RSSI value is less then T, CAP process 500 may flow to processing block 514 where CAP Module 440 may read CAP Action Set instruction defined for RSSI value being less than T. At decision block 515 CAP process 500 may flow to one or more correction and/or action processes.

In a particular embodiment, a CAP Action Set determined based at least in part on RSSI input value may indicate that a change in SS TX power and/or boosting power is an appropriate LA action. At processing block 516 current SS TX power and/or boosting level may be updated. At processing block 518 a new configuration may be sent to the data plane. In the case of an uplink correction, at processing block 520 a new power correction may be sent to a SS 104.

In a particular embodiment, a CAP Action Set determined based at least in part on RSSI input value may indicate that handover is an appropriate LA action. In processing block 522, handover may be reported to UA 406.

In a particular embodiment, a CAP Action Set determined based at least in part on RSSI input value may indicate that a layer change is an appropriate LA action. At decision block 524, if a new layer is found and CAP process 500 flows to block 526, updating the current layer variable to UA 406 and further continues to processing block 532 where a new layer configuration is sent to UA 406 data plane. If a new layer is not found an error is reported to UA 406 at block 528.

Figure 6:
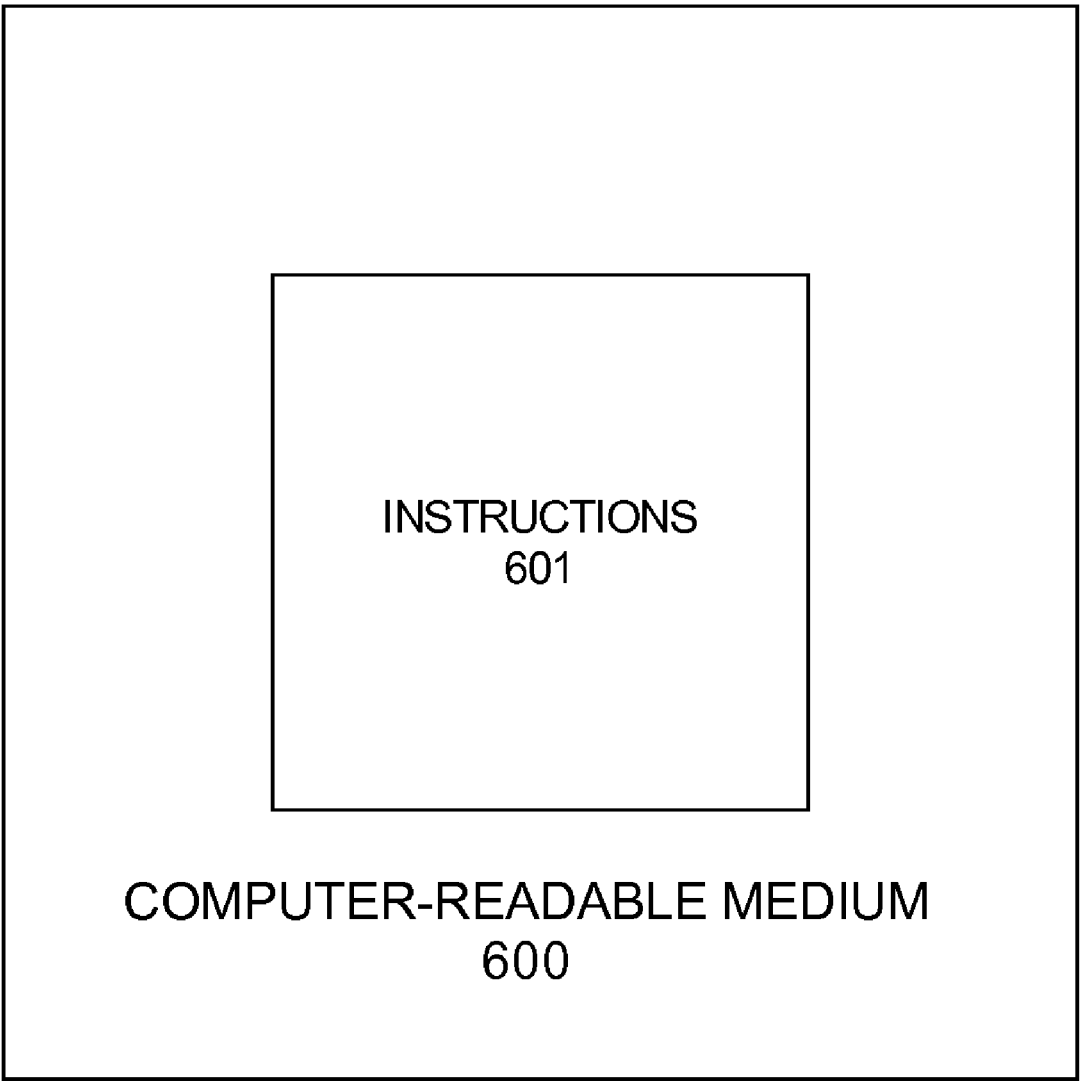
FIG. 6 depicts a computer-readable medium having instructions, which if executed by a computer, cause the computer to perform operations in accordance with the subject matter disclosed herein.

FIG. 6 depicts a computer-readable medium having instructions, which if executed by a computer, cause the computer to perform operations in accordance with the subject matter disclosed herein. In particular, the subject matter disclosed herein comprises a computer-readable medium 600 having instructions 601, which if executed by a computer, cause the computer to perform operations, the operations comprising: receiving configuration data comprising Link Adaptation (LA) solution parameters; configuring one or more correction and action policy (CAP) layers based on received LA solution parameters; determining an initial state CAP layer based at least in part on received configuration data; receiving first input data and second input data for determining the LA solution; determining a first CAP Area within the initial state CAP layer based at least in part of the first input data and second input data; receiving third input data for determining the LA solution; determining a CAP Action-Set within the first CAP Area based at least in part of the third input data, wherein the CAP Action Set comprises instructions for the LA solution; and initiating execution of the instructions for the LA solution. In one embodiment, the first input data comprises: Carrier to Interference-and-Noise Ratio (CINR), boosting power level, subscriber station transmission (SS TX) power or Received Signal Strength Indication (RSSI), or combinations thereof. In another embodiment, the second input data comprises: CINR, boosting power level, SS TX power or RSSI, or combinations thereof. In another embodiment, the third input data comprises: CINR, boosting power level, SS TX power or RSSI, or combinations thereof. In another embodiment, the instructions comprise: do nothing, increase SS TX power, decrease SS TX power, increase boosting power, decrease boosting power, request starting of a hand-over procedure, request starting of a scanning action or request a CAP layer change, or combinations thereof. In another embodiment, the operations further comprise reporting execution of instructions to a data plane. In one embodiment, configuring one or more CAP layers further comprises correlating one or more modulation schemes to each of the one or more CAP layers.

While certain features of claimed subject matter have been illustrated as described herein, many modifications, substitutions, changes and equivalents will now occur to those skilled in the art. It is, therefore, to be understood that the appended claims are intended to cover all such embodiments and changes as fall within the spirit of claimed subject matter.

What is claimed is:

1. A method for determining a Link Adaptation solution, comprising:
   receiving configuration data comprising Link Adaptation (LA) solution parameters;
   configuring one or more correction and action policy (CAP) layers based on received LA solution parameters;
   determining an initial state CAP layer based at least in part on received configuration data;
   receiving first input data and second input data for determining the LA solution;
   determining a first CAP Area within the initial state CAP layer based at least in part of the first input data and second input data;
   receiving third input data for determining the LA solution;
   determining a CAP Action Set within the first CAP Area based at least in part of the third input data, wherein the CAP Action Set comprises instructions for the LA solution; and
   initiating execution of the instructions for the LA solution.

2. The method of claim 1, wherein the first input data comprises: Carrier to Interference-and-Noise Ratio (CINR), boosting power level, subscriber station transmission (SS TX) power or Received Signal Strength Indication (RSSI), or combinations thereof.

3. The method of claim 1, wherein the second input data comprises: CINR, boosting power level, SS TX power or RSSI, or combinations thereof.

4. The method of claim 1, wherein the third input data comprises: CINR, boosting power level, SS TX power or RSSI, or combinations thereof.

5. The method of claim 1, wherein the instructions comprise: do nothing, increase SS TX power, decrease SS TX power, increase boosting power, decrease boosting power, request starting of a hand-over procedure, request starting of a scanning action or request a CAP layer change, or combinations thereof.

6. The method of claim 5, further comprising, reporting execution of instructions to a data plane.

7. The method of claim 1, wherein configuring one or more CAP layers further comprises correlating one or more modulation schemes to each of the one or more CAP layers.

8. A non-transitory computer-readable medium having instructions, which if executed by a computer, cause the computer to perform operations, said operations comprising:
- receiving configuration data comprising Link Adaptation (LA) solution parameters;
- configuring one or more correction and action policy (CAP) layers based on received LA solution parameters;
- determining an initial state CAP layer based at least in part on received configuration data;
- receiving first input data and second input data for determining the LA solution;
- determining a first CAP Area within the initial state CAP layer based at least in part of the first input data and second input data;
- receiving third input data for determining the LA solution;
- determining a CAP Action-Set within the first CAP Area based at least in part of the third input data, wherein the CAP Action Set comprises instructions for the LA solution; and
- initiating execution of the instructions for the LA solution.

9. The non-transitory computer-readable medium of claim 8, wherein the first input data comprises: Carrier to Interference-and-Noise Ratio (CINR), boosting power level, subscriber station transmission (SS TX) power or Received Signal Strength Indication (RSSI), or combinations thereof.

10. The non-transitory computer-readable medium of claim 8, wherein the second input data comprises: CINR, boosting power level, SS TX power or RSSI, or combinations thereof.

11. The non-transitory computer-readable medium of claim 8, wherein the third input data comprises: CINR, boosting power level, SS TX power or RSSI, or combinations thereof.

12. The non-transitory computer-readable medium of claim 8, wherein the instructions comprise: do nothing, increase SS TX power, decrease SS TX power, increase boosting power, decrease boosting power, request starting of a hand-over procedure, request starting of a scanning action or request a CAP layer change, or combinations thereof.

13. The non-transitory computer-readable medium of claim 12, further comprising, reporting execution of instructions to a data plane.

14. The non-transitory computer-readable medium of claim 8, wherein configuring one or more CAP layers further comprises correlating one or more modulation schemes to each of the one or more CAP layers.

* * * * *